(12) United States Patent
Li et al.

(10) Patent No.: US 7,414,523 B2
(45) Date of Patent: Aug. 19, 2008

(54) AUTOMOBILE TIRE MONITORING SYSTEM AND TIRE IDENTIFICATION METHOD

(75) Inventors: Wei Li, Shanghai (CN); Hongling Chen, Shanghai (CN)

(73) Assignee: Shanghai Baolong Industries Co., Ltd., Shanghai (CN)

( * ) Notice: Subject to any disclaimer, the term of this patent is extended or adjusted under 35 U.S.C. 154(b) by 222 days.

(21) Appl. No.: 11/240,324

(22) Filed: Sep. 30, 2005

(65) Prior Publication Data

US 2006/0187014 A1    Aug. 24, 2006

(30) Foreign Application Priority Data

Feb. 6, 2005    (CN) .......................... 2005 1 0023887

(51) Int. Cl.
*B60C 23/00* (2006.01)
(52) U.S. Cl. .................. 340/447; 340/442; 340/447; 73/146; 73/146.5
(58) Field of Classification Search ................. 340/442, 340/447; 73/146, 146.5
See application file for complete search history.

(56) References Cited

U.S. PATENT DOCUMENTS 5,883,305 A    3/1999    Jo et al.

7,202,777 B2 *    4/2007    Tsuji et al. ................. 340/445
2005/0057348 A1    3/2005    Hammerschmidt \* cited by examiner

*Primary Examiner*—Daryl C Pope
(74) *Attorney, Agent, or Firm*—Butzel Long

(57) ABSTRACT

An automobile tire pressure monitoring system and tire identification method that includes a transmitting and detecting unit provided on each tire, as well as a receiving and display unit that includes a receiving unit, a main control unit and a display unit. A plug-in encoding memory is plugged into the receiving and display unit. One fixed ID code, which is the same as that for the encoding memory, is provided for each transmitting and detecting unit. When the power is on, the receiving and display unit reads the ID code in each plug-in encoding memory plugged into the socket of the display unit, and saves the information on the corresponding relationships between ID codes saved in memories and the tire identity. After receiving the signal from the transmission unit, the receiving and display unit reads the ID codes in it, and determines whether these codes are identical with those in the memories. If the signal is valid, the receiving and display unit compares the corresponding relationships, determines on which tire the detection unit is transmitting the signal, and displays the information about pressure and temperature in corresponding display areas.

3 Claims, 13 Drawing Sheets

AUTOMOBILE TIRE MONITORING SYSTEM AND TIRE IDENTIFICATION METHOD

TECHNICAL FIELD

The present invention relates to automobile tire monitoring systems and in particular to automobile tire pressure monitoring systems. The present invention is more specifically directed to a tire pressure monitoring system which uses a plug-in external encoding memory to identify each tire.

BACKGROUND OF THE INVENTION

Tire Pressure Monitoring Systems, abbreviated as TPMS, are mainly used to automatically monitor tire pressure and provide an early warning of low tire pressure caused by air leakage or high tire pressure caused by high temperature so as to avoid tire rupture and ensure safety driving.

Generally, a tire pressure monitoring system consists of a transmitting and detecting unit (one for each tire) and a receiving and display unit (only one):

The circuit of the transmitting and detecting unit consists of a temperature and pressure sensor, a MCU (Main Control Unit), a transmitter, and a battery. The unit includes a protective casing that protects the electric circuit and includes a device for fastening the casing on the run of the tire.

The circuit of the receiver consists of battery unit, a receiver, a MCU and a display unit. The structure for the circuit comprises a casing, a function switch set on the surface of the casing and a display screen.

Figure 1:
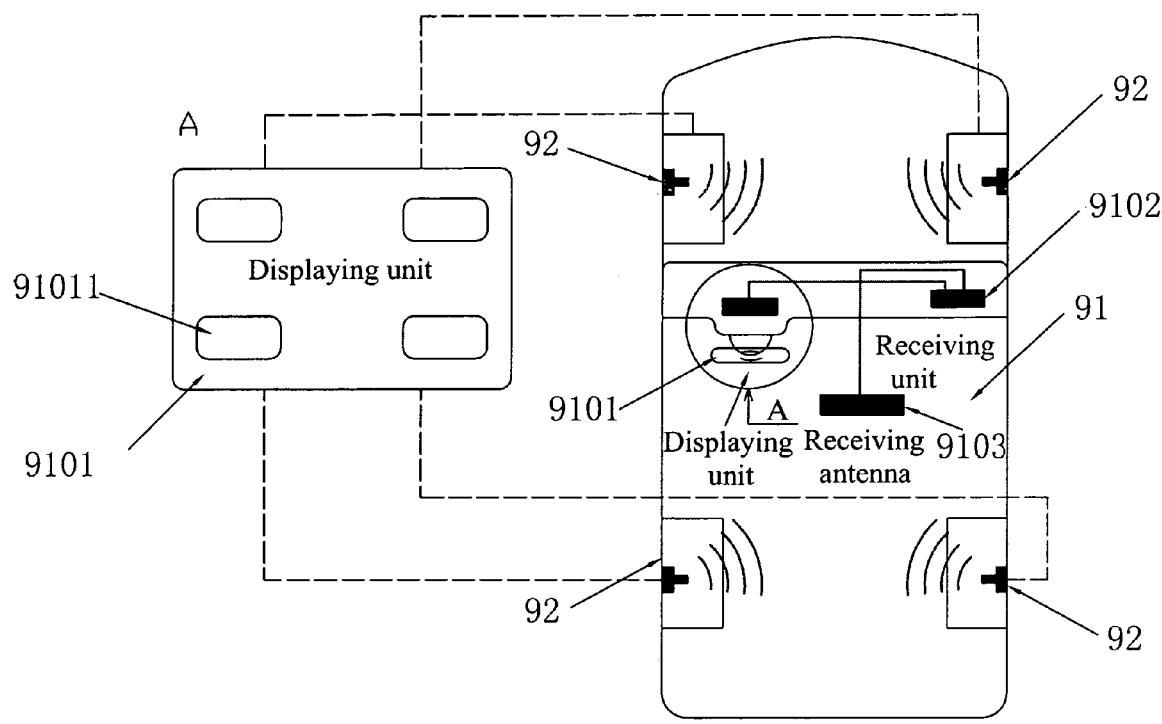

As shown in FIG. 1, an automobile tire pressure monitoring system generally consists of a transmitting and detecting unit 92 and a receiving and display unit 91, which thereupon comprises display unit 9101, receiving unit 9102 and receiving antenna 9103.

The left side of FIG. 1 is a front sketch diagram of the display unit, i.e., the screen that is displayed on the automobile instrument panel. The display unit 9101 of an ordinary automobile includes four data display areas 91011, that display the parameters of the four tires respectively. The broken lines in FIG. 1 represent the correlations between the display area 91011 and the respective tires.

The operation process is as follows: The sensor in the transmitting and detecting unit 92 onverts variations of the tire pressure into electric parameters which vary accordingly to electronic component induction. Then the electric parameters are processed by a MCU in the transmitting and detecting unit into digital code signals. After identification of the ID of the digital code signals in this unit (used to distinguish it from other units) is completed, these code signals are transmitted via a carrier frequency by a transmitter. The original data is recovered after the radio signals are received and demodulated by the receiver antenna 9103. Then, after being processed by the MCU of receiving and display unit, the data is displayed on the corresponding tire data area of the user's interface by the display screen installed in the vehicle. In this way, the driver can clearly know the pressure in each tire. When the received data shows the pressure in the tire is lower or higher than the set limit, the MCU will show an alarm icon on the display screen. The driver can then take appropriate action for the tire according to the data of tire pressure shown so as to ensure safe driving.

One transmitting and detecting unit is available for each of the four tires. In the MCU memory of the transmitting and detecting unit, the ID code of that unit has been set (Used to distinguish it from other identification codes). The identification code of the unit is provided in the signals. Through comparing an ID code that is pre-saved in the MCU memory with the received ID code, MCU of the receiving and display unit identifies the relation between IDs and determines which tire the data is associated with. After processing, the corresponding pressure and temperature information on the respective area will be displayed on the screen. With the judgment for ID codes, the receiving and display unit can determine the received information sent by other transmitting and detecting units to be unwanted and discard it.

The tire transposition is usual:

Because of the different loads on the four tires, caused by the front-wheels being responsible for veering, and the rear and front axle hanging in different angles, the degrees and the positions of abrasion for each tire are usually different. In order to improve the stability while turning, the rear wheels of most front-driving and front-veering vehicles have a larger tilt angle than the front wheels taking an outward shape of Chinese character "八"(Several kinds of vehicles take an inward shape of Chinese character "八"which is decided by the hanging design.). As a result, the rear wheels are liable to abrade on the inside and outside rim, i.e., the section that forms a trapezoid. Similarly, the same abrasion may occur to the rear wheels. In order to prolong the service life of the tire, and for the purpose of four tires abrading synchronously and equably, regular tire rotation is required.

In the process of tire rotation the corresponding transmitting and detecting units will be transposed. This will cause the original correlation between ID code saved in MCU memory of the receiving and display unit and the tire identification information to be miscorrelated so that the information displayed on the screen about the pressure and temperature as correlated with the tire is wrong.

When a new tire is installed, or when the transmitting and detecting unit on a tire is replaced as it becomes damaged, the ID code of the new unit will be different from the original ID. Consequently, the identification information of the ID code saved in the MCU memory of the receiving and display unit and the corresponding tire is no longer applicable to the ID code of the newly replaced unit. The receiving and display unit will discard the information received from the replaced unit. The pressure and temperature information sent by the new unit will not be displayed on the screen.

Nowadays, four methods are mainly adopted in the world to solve the problem of tire identification during tire transposition and replacement. The technologies and their respective characteristics for the four identification methods are as follows:

1. Fixed encoding method: The correlation between ID code in the MCU memory of the receiving and display unit and the tire identification information is fixed at the factory. The same ID code is also fixed in the MCU memory of the transmitting and detecting unit and is marked on the surface of the transmitting and detecting unit. During the installation, the transmitting and detecting units are installed on the corresponding tires in accordance with the marks and no change is allowed during application. This method is quite simple and its shortcoming is that wrong installation is not allowed. Otherwise, identification confusion may arise. Meanwhile, if a transmission unit is damaged, the user has to go to the manufacturer for repair or replacement. The transmitting and detecting units must be reinstalled in accordance with their marked positions when the tires are rotated.

2. The method of interface input: This kind of identification technology is to print the ID code of each transmission unit on the packing of the product or on the product itself. However, after a tire is rotated or a transmission unit is damaged, the ID code should be input into the receiving port to make a correct identification. The shortcoming of this method that since the ID codes are 16 or 32 digits, the input procedure is complicated and the user is liable to mis-input the code set. Furthermore, the numerous buttons cause inconvenience and awkward layout in the automobile.

Figure 2:
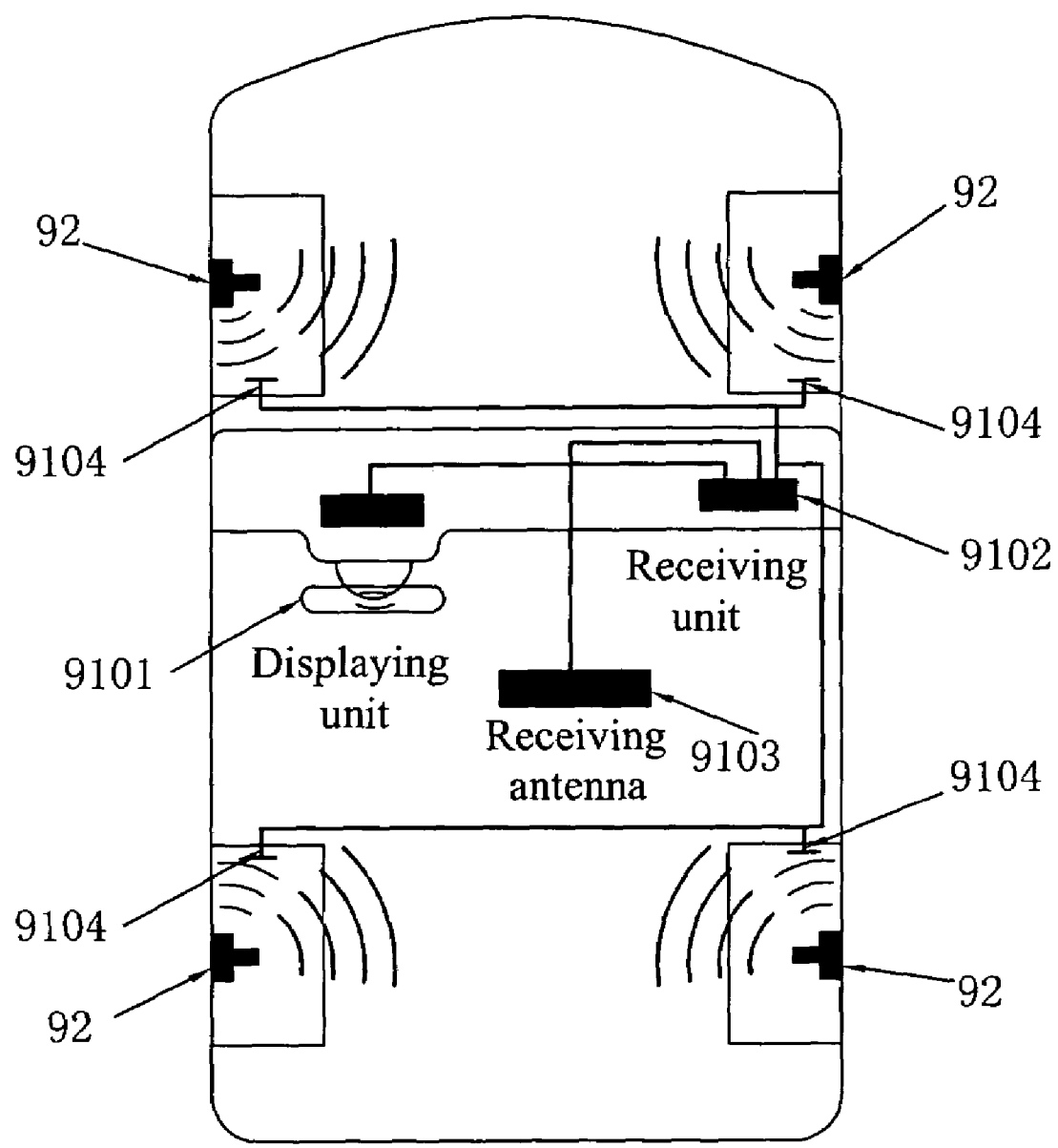

3. The method of low frequency (LF) wake-up: This technology makes use of the near-field effect of the LF signals (for example 125 KHZ). As shown in FIG. 2, there is a LF antenna 9104 near each tire in this scheme. By sending LF signals to the LF antenna near the corresponding tire, the monitoring system can trigger the corresponding tire's transmitting and detecting unit 92 respectively, which transmits the ID code through RF. The receiving unit 9102 obtains the corresponding identification code of the tire's TPMS unit via this signal and thus automatically locates the tire. The shortcomings of this method are that: 1) Four LF antennae 9104 should be installed near the corresponding tires. To install and lay out the wires involves a considerable amount of work; 2) The LF signals may mistakenly trigger an adjoining transmitting and detecting unit; and 3) Due to the complicated electromagnetic environment and disturbances, the LF signals can be disturbed, which leads to the ineffectiveness of the identification process.

Figure 3:
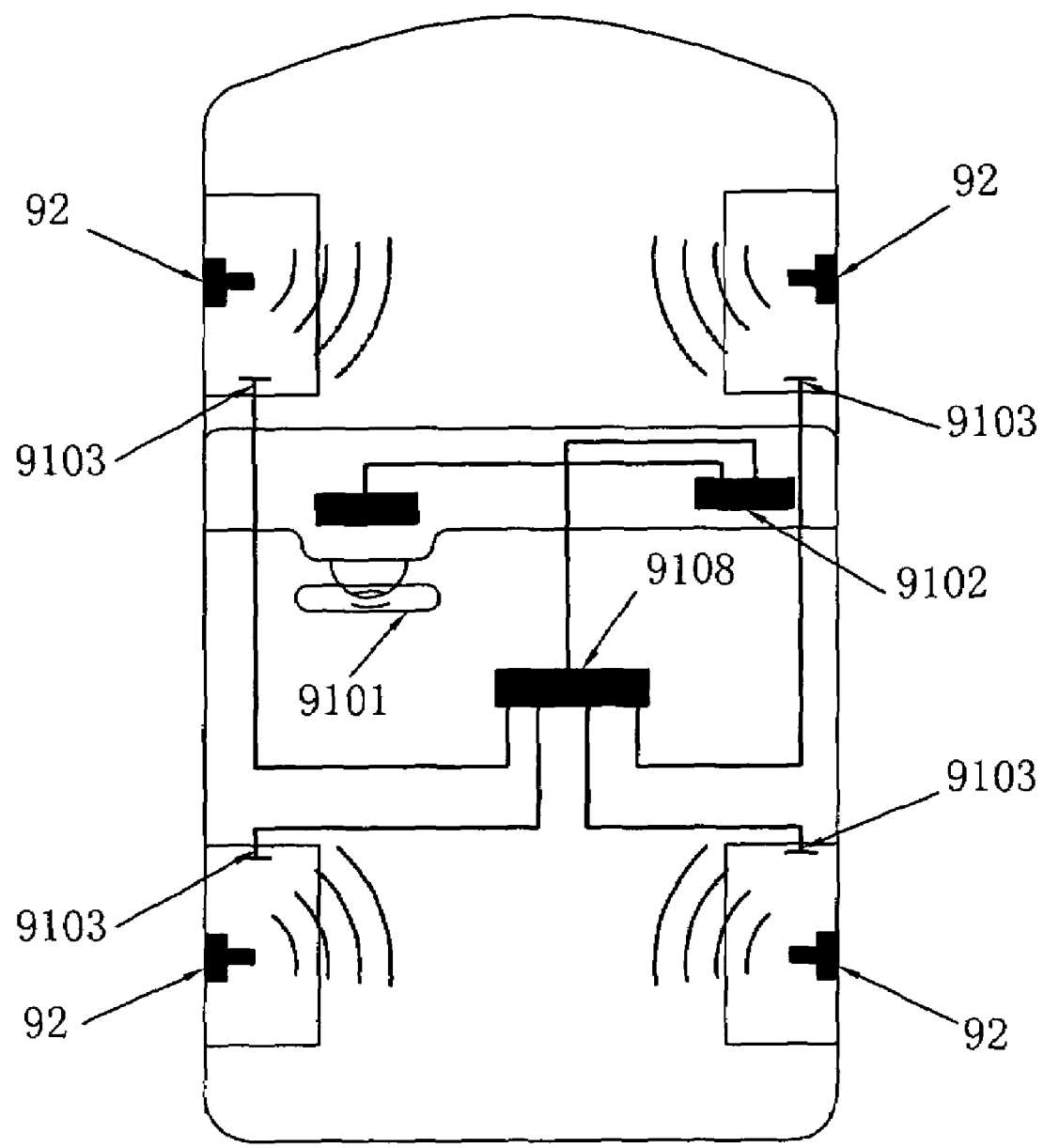

4. The method of antenna near field receiving: As shown in FIG. 3, this technology includes four receiving antennae of the receiving and display unit 9103 which stretch over the near field within 20-30 cm around each tire and are controlled by numerical controlled microwave switch 9108. When the information sent by the transmitting and detecting unit of a certain tire needs to be received, it is only when the microwave switch of the receiving antenna near that tire is on and the others are off that the pressure and temperature of the tire, which the RTPM unit is connected to, can be displayed on the receiving screen. The shortcomings of this identification technology are that: 1) The layout of the antennae is complex and the microwave switch is costly. Moreover, the isolation of the RF switches is not good enough at the present time, so there exists the possibility of mixed code, i.e. receiving the information from other tires; and 2) Due to the complicated electromagnetic environment and all kinds of disturbance in an automobile, the LF signals will be disturbed, which will lead to the ineffectiveness of the identification process.

To summarize, the above-mentioned identification technologies have one or more of the defects as follows:

1. The transmission unit installation cannot be displaced. So faulty transmission units have to be sent to the factory for burning the corresponding identification code.
2. It is a tedious job to input the identification code. The users may mis-input the identification code.
3. The design or the layout may be influenced.
4. Four LF antennae are required to be installed, which will cause difficulties.
5. LF signals may mistakenly trigger adjoining transmitting and detecting units.
6. The antenna design is complex, the RF switch is costly, and RF isolation is not sufficient.

SUMMARY OF THE INVENTION

The invention provides an automobile tire pressure monitoring system in which the tire identification is safe, effective, and as simple and as convenient as possible, so as to overcome the shortcomings in prior art mentioned above.

According to the present invention an automobile tire pressure monitoring system is provided that comprises transmitting and detecting units with one set on each tire, each including a sensor, a transmitter and a transmitting antenna on each tire, and a receiving and display unit, that includes a receiving unit, a MCU (main control unit), and a display unit, with the feature that a plug-in encoding memory is plugged into the receiving and display unit. A fixed ID code is set for each transmitting and detecting unit. This ID code is the same as the ID in the encoding memory.

A socket may be provided in each receiving and display unit respectively for plugging in the encoding memory. A fixed ID code which is the same as that of the encoding memory, may be set in the transmitter of the transmitting and detecting units.

There is one plug-in encoding memory for each transmitter, and the fixed ID code of the transmitter is the same as that of the encoding memory. When tire is rotated all that has to be done is to plug in the encoding memory at the corresponding display area of the tire. When the tire needs replacing, only a set of transmitter and the replug-in encoding memories have to be purchased and installed at the respective tire and receiving and display unit.

The working steps of the method by which the automobile tire pressure monitoring system monitors the tire are as follows:

Start and initialize the display unit,
Read in the ID codes in the circuit of the four plug-in external encoding memories,
Wait to receive data sent from the receiving unit,
Judge whether the ID code in the received data is the same as that read,
If the data are different, discard the data and continue to wait to receive the data,
If the data are identical, determine the corresponding display area of the ID code, and
Display the received data on the screen and continue waiting to receive data.

The data sent to the display unit by the receiving unit is processed in the way that the data obtained by the sensor is amplified and converted by A/D. Then the data is encoded with the ID code, modulated, re-amplified, and finally transmitted via the antenna.

At each startup, the receiving and display unit reads the ID code of the plug-in encoding memory plugged into the display unit socket on the receiving and display unit, and then resets the corresponding information on the ID code saved in the MCU (main control unit) memory at the receiving and display unit and the tire identification, and saves the information. After reading the ID code in the signals sent by the transmission unit, the receiving unit determines which tire the transmitting and detecting unit is sending the signals according to the corresponding relationship between the ID code in the MCU memory at the receiving and display unit and the tire, and displays the information about the pressure and temperature at corresponding area.

When a tire needs rotation, the user will only have to transpose the corresponding plug-in encoding memory. Next time when the power is on, the receiving and display unit resets the corresponding relationship between the ID code saved in the MCU memory of the receiving and display unit and the tire, and displays the information in the right display area.

Since each transmitter has its own corresponding plug-in encoding memory, whenever the user finds that a certain transmitter is damaged, he does not have to resort to the manufacturer, but can purchase a set of transmitter and the accessory plug-in encoding memories and install the new transmitter, and remove the old encoding memory and plug in the new plug-in encoding memory. Next time when the power is on, the receiving and display unit resets the corresponding relationship between the ID code saved in the MCU memory of the receiving and display unit and the tire, and displays the signals transmitted by the transmitting and detecting unit in the right display area.

This invention applies the encoding plug technology to TPMS, and converts the re-identification issue caused by tire transposition and tire replacement into the issue of resetting the ID code, so as to provide a simple and effective technological solution for tire re-identification. Because of the adoption of plug-in method, the operation is easy and reliable.

The invention adopts the encoding technology, reading in the ID code in the plug-in encoding memory via I/O (input/output) rather than via radio signals. This avoids the problem of LF (low frequency) signals being disturbed in transmitting by the electromagnetic noise in the automobile and essentially solves the disturbance problem.

The following contents describe the invention in detail with reference to drawings.

DRAWINGS DESCRIPTION

Figure 4:
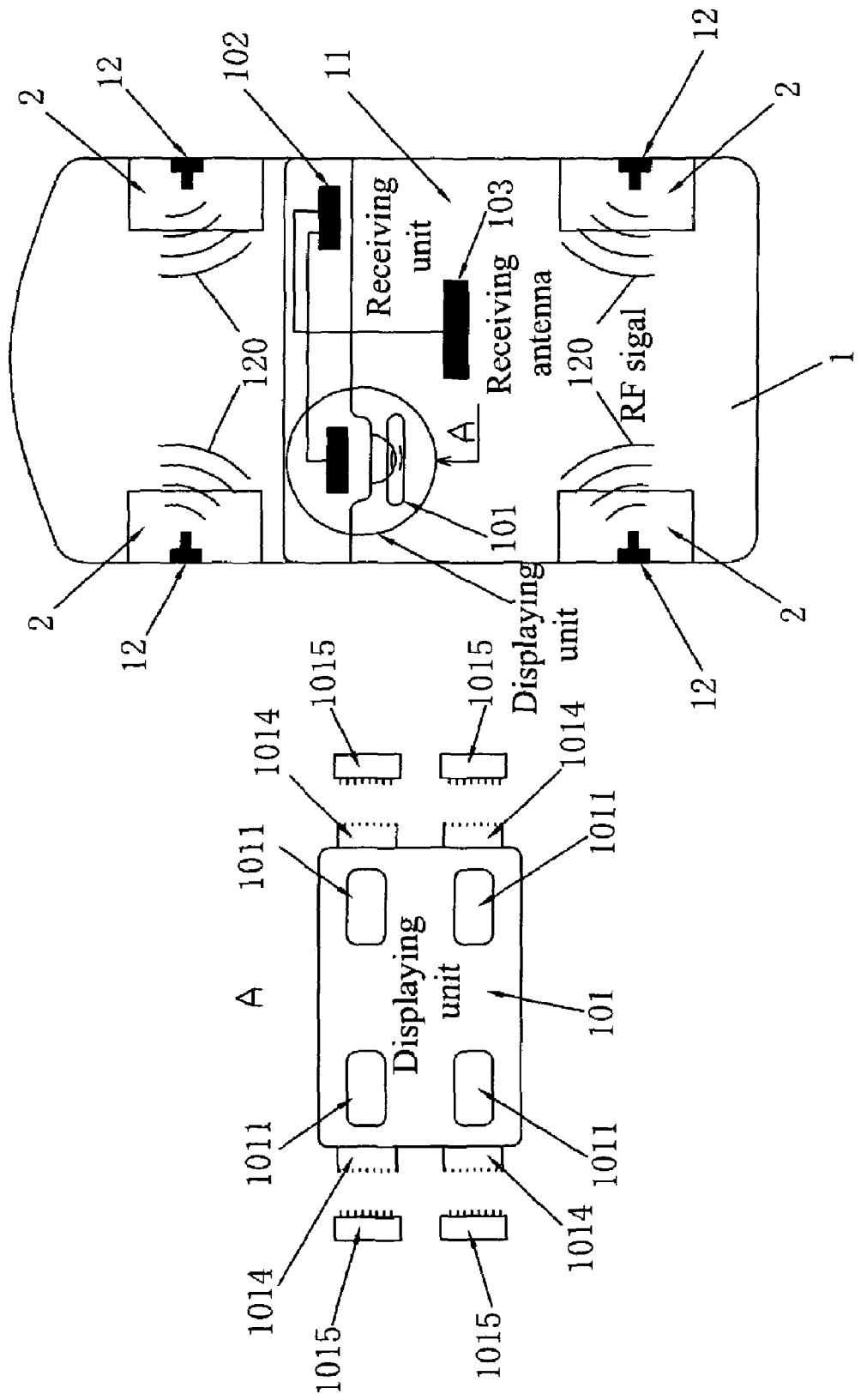
Figure 5:
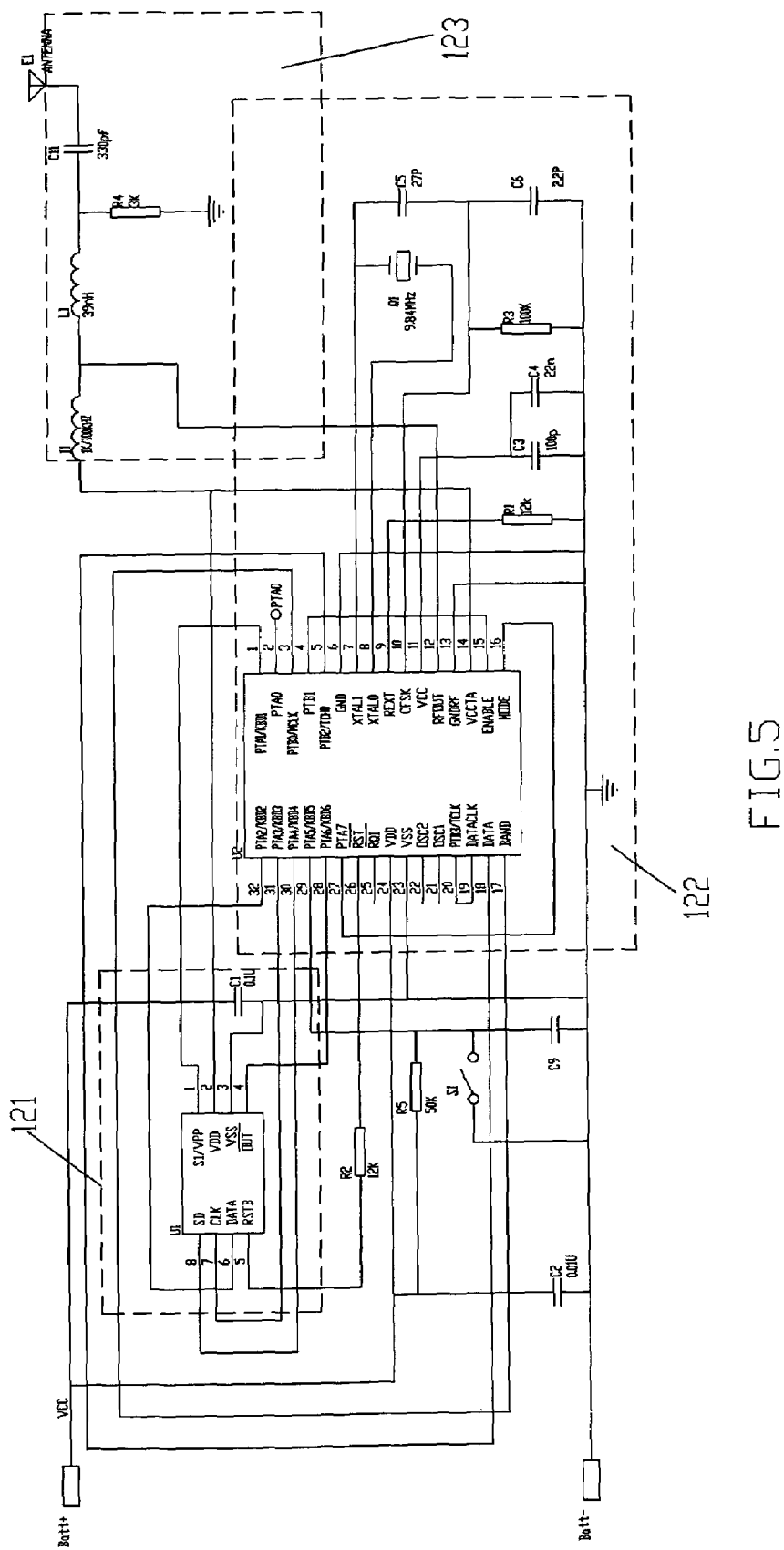
Figure 6:
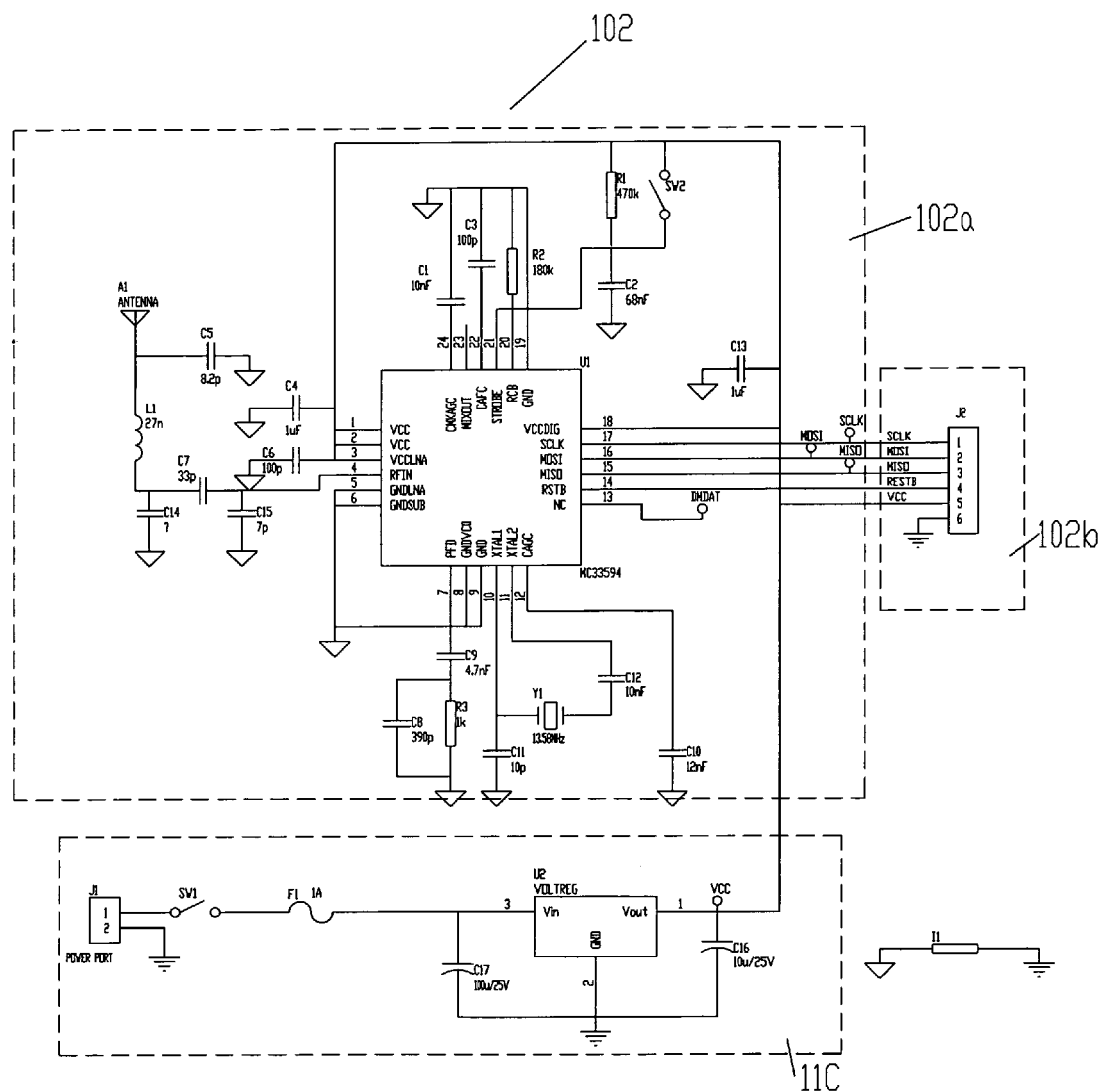
Figure 7:
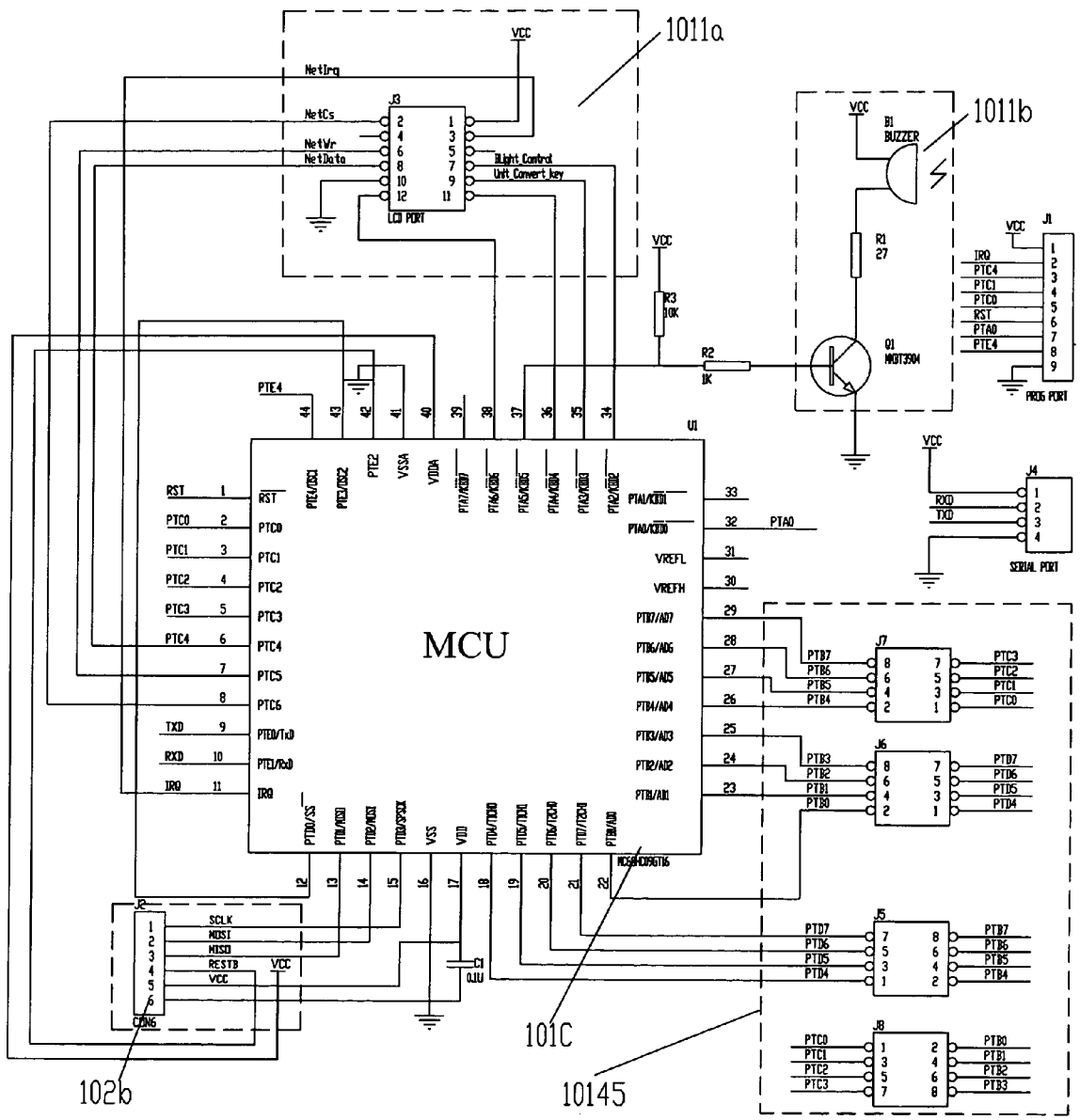
Figure 8:
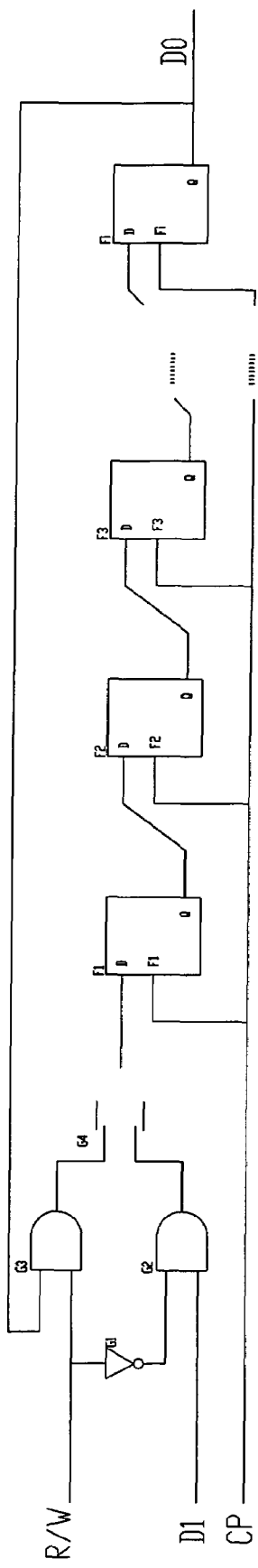
Figure 9:
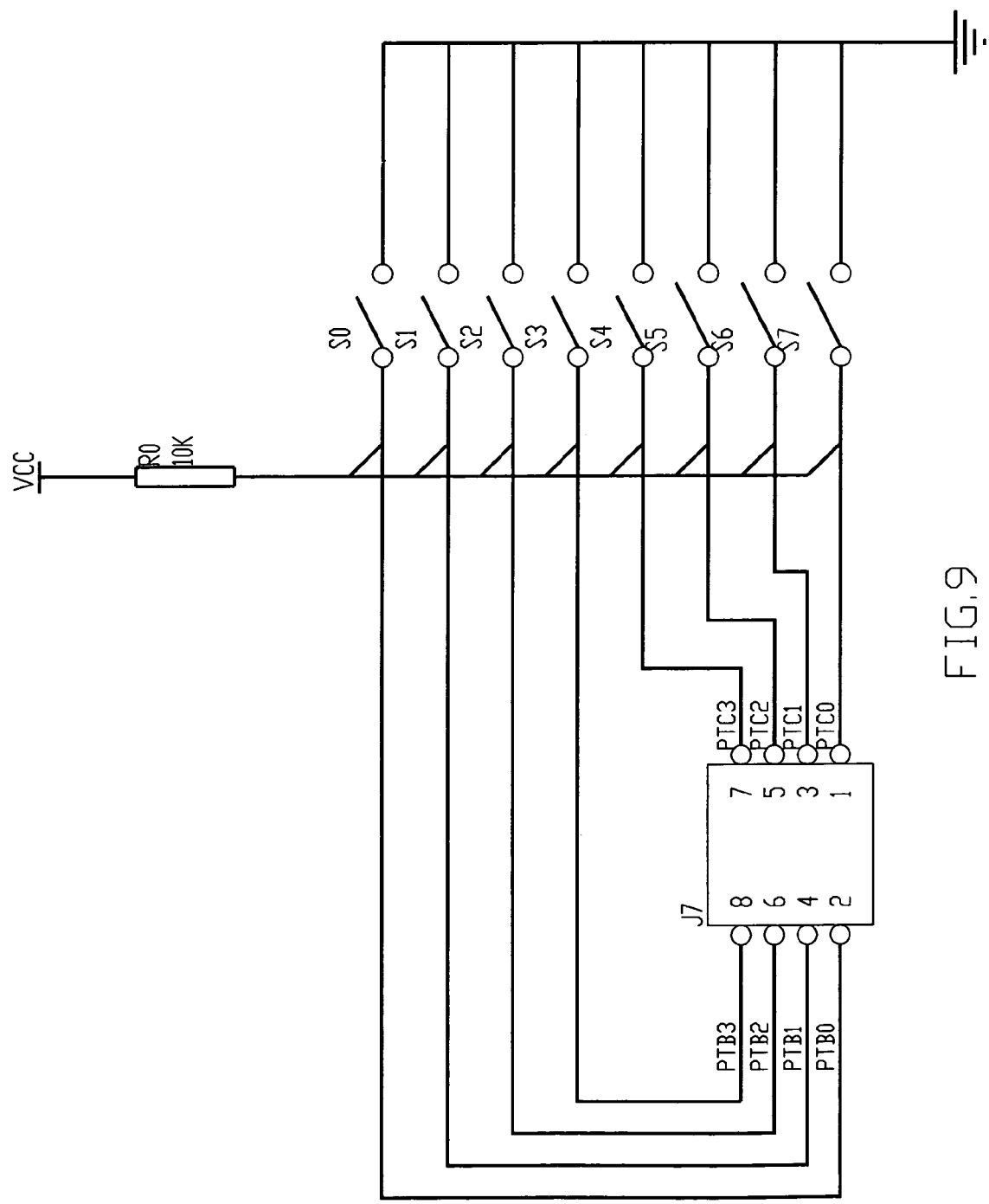
Figure 10:
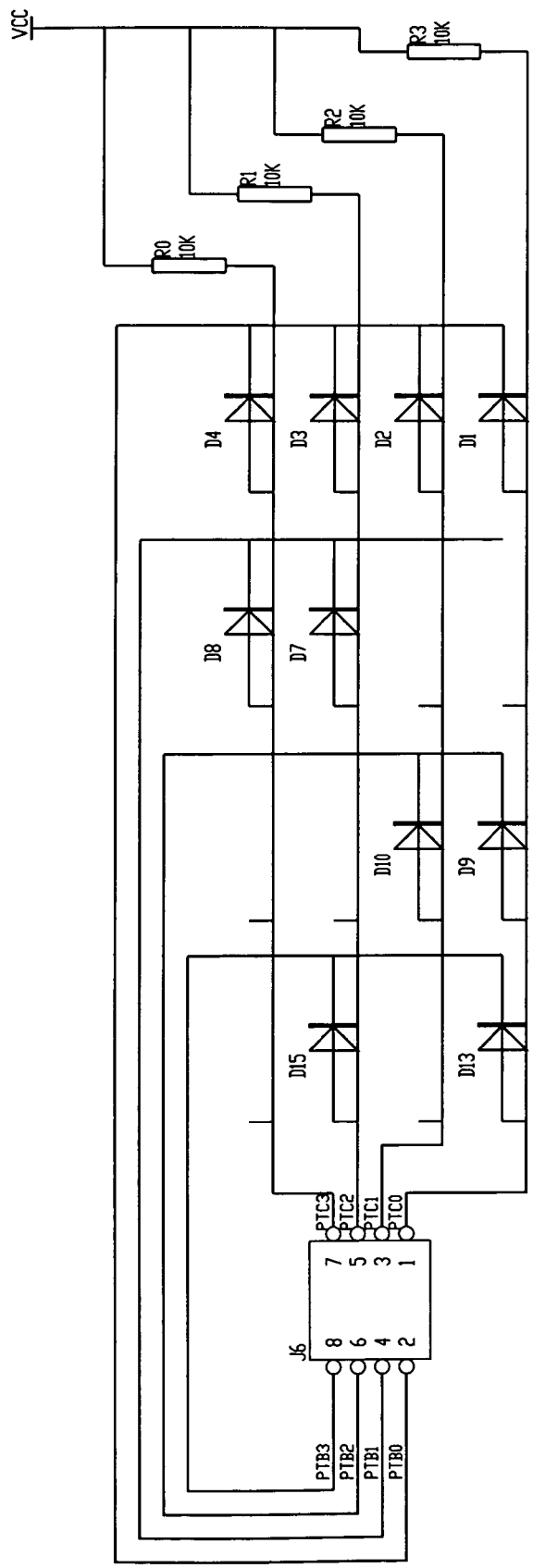
Figure 11:
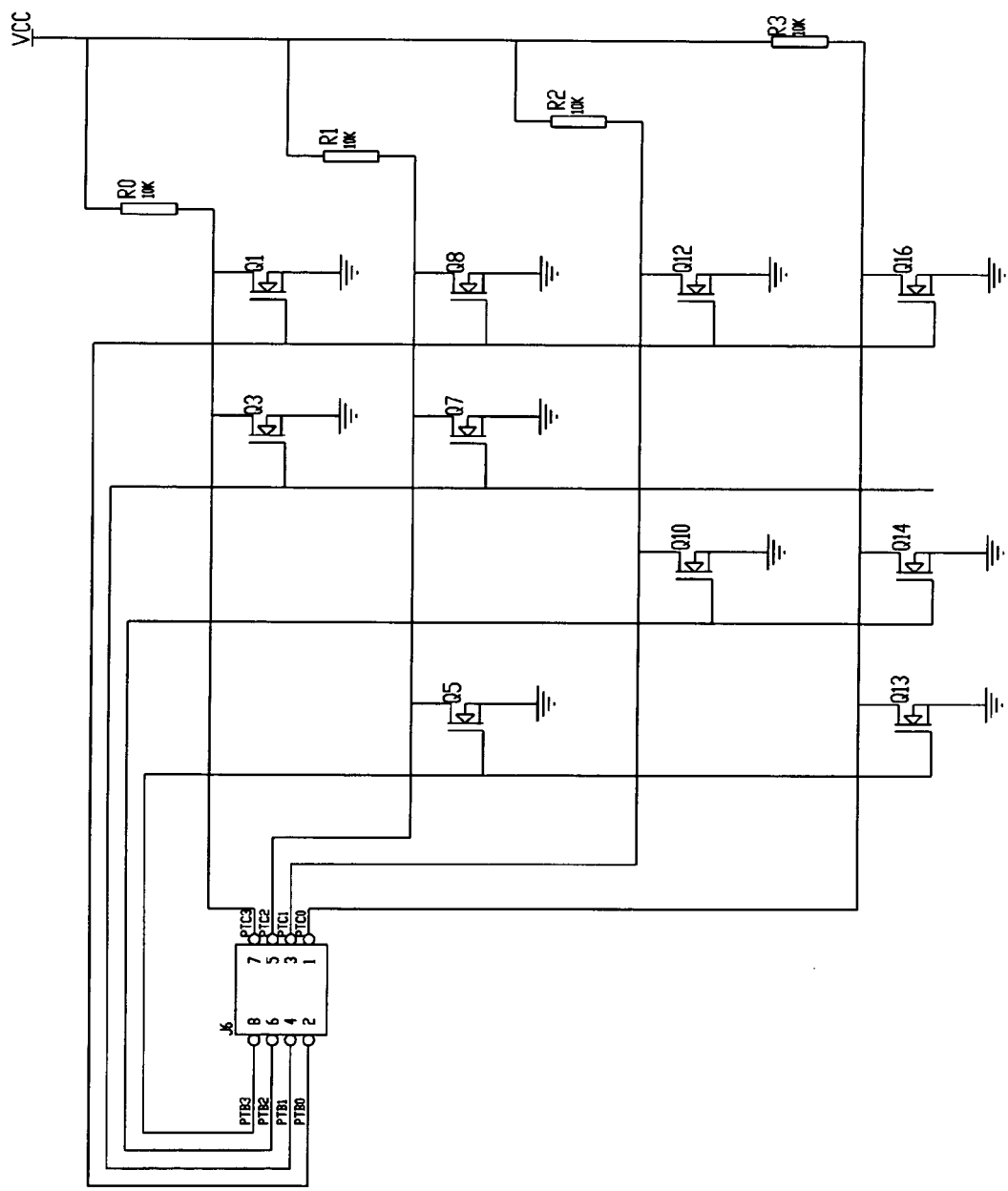
Figure 12:
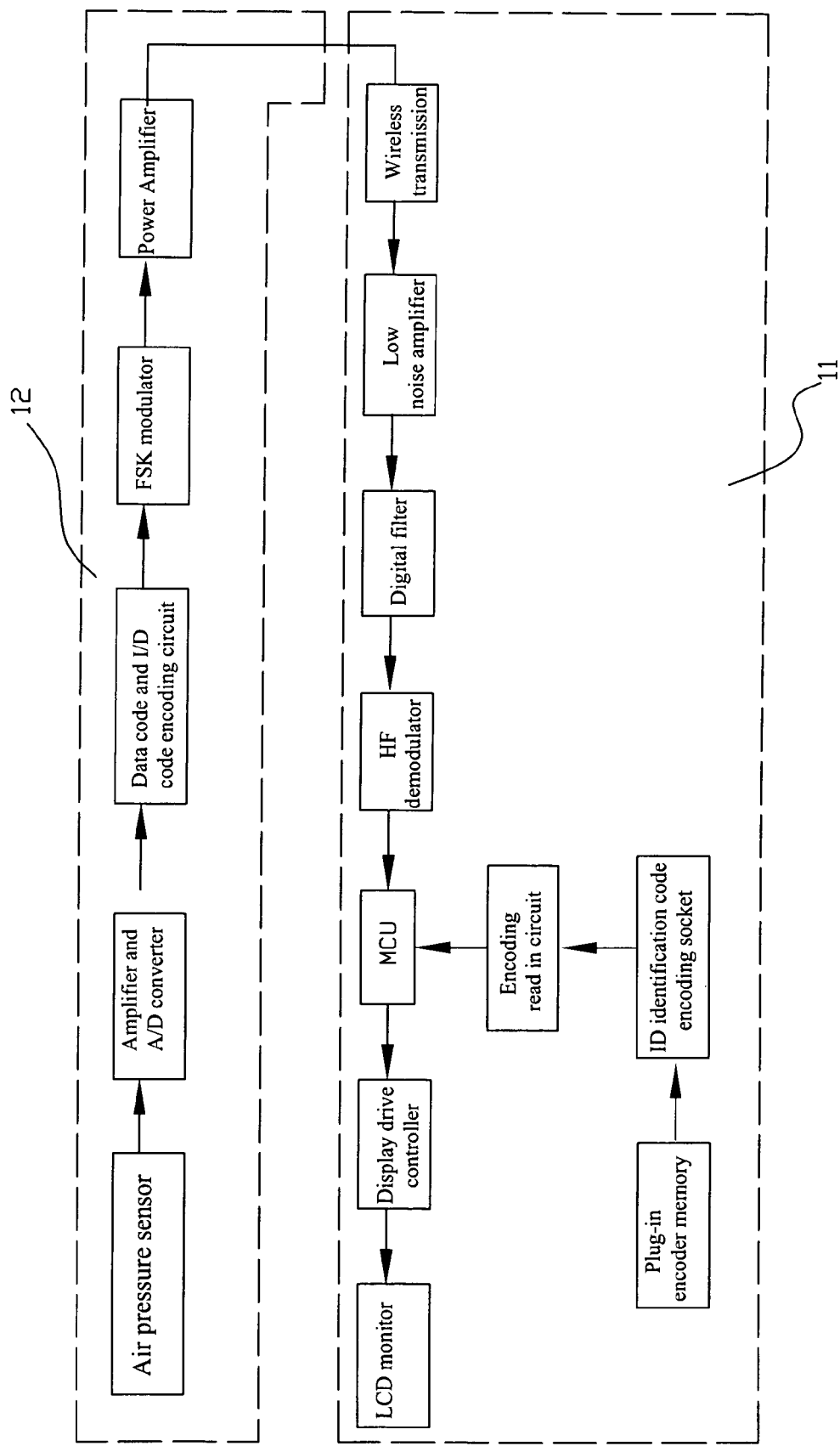
Figure 13:
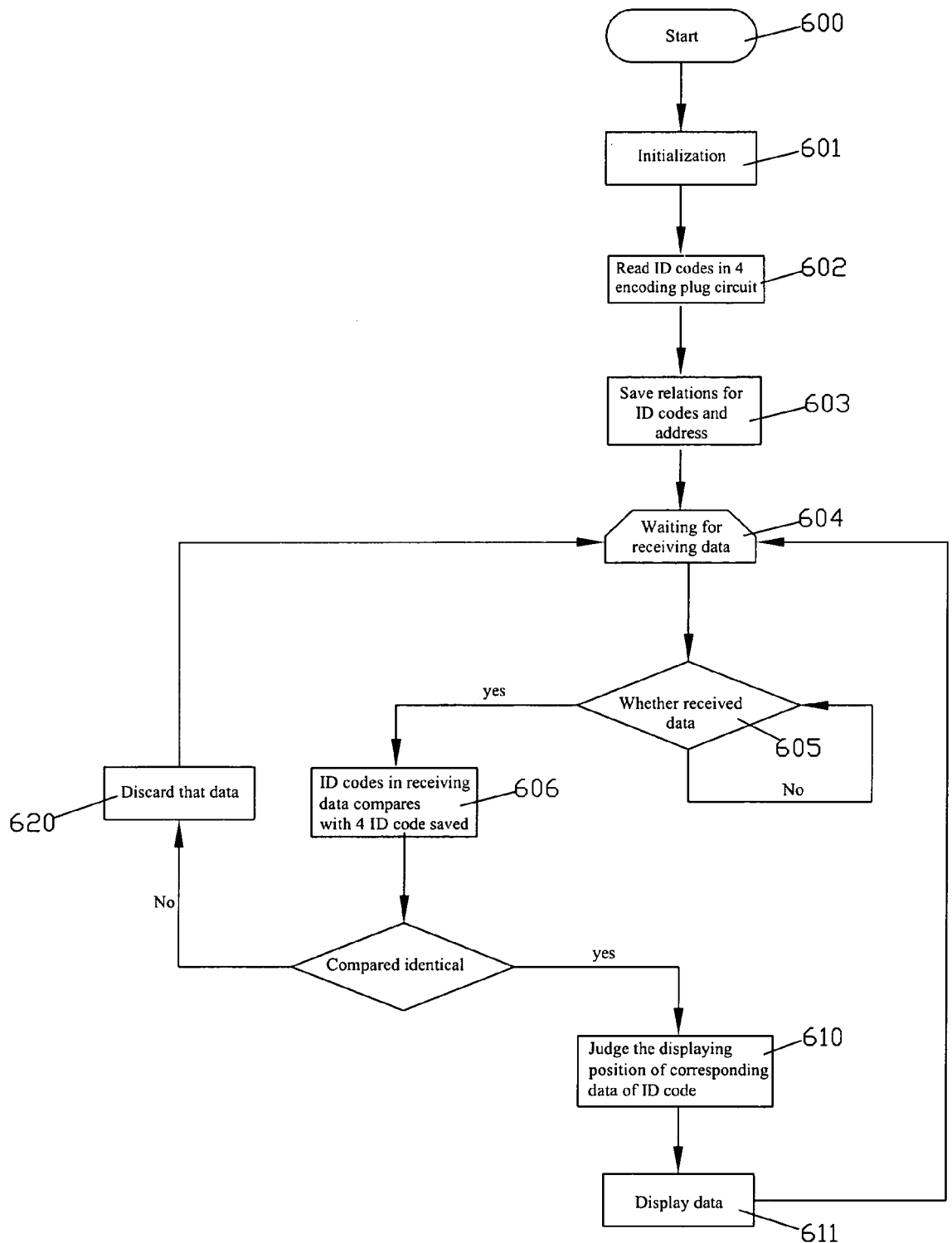

FIG. 1 is a schematic drawing of the automobile tire monitoring system under existing technologies, FIG. 2 is a schematic drawing of the existing low frequency wake-up automobile tire monitoring system, FIG. 3 is a schematic drawing of the existing near field antenna receiving and transmitting automobile tire monitoring system, FIG. 4 is a schematic drawing of the automobile tire monitoring system according to one embodiment of the present invention, FIG. 5 is a circuit schematic drawing of an exemplification of the transmitting and detecting unit according to one embodiment of the present invention, FIG. 6 is a circuit schematic drawing of an exemplification of the receiving unit according to one embodiment of the present invention, FIG. 7 is a circuit schematic drawing of an exemplification of the display unit according to one embodiment of the present invention, FIG. 8 is a schematic drawing of the memory in the encoding plug in the present invention which is a shift memory, FIG. 9 is a schematic drawing of the memory in the encoding plug in the present invention which is a switching matrix memory, FIG. 10 is a schematic drawing of the memory in the encoding plug which is a diode matrix memory, FIG. 11 is a schematic drawing of the memory in the encoding plug which is a MOS matrix memory, FIG. 12 is a schematic drawing of operational procedure of a monitoring system according to one embodiment of the present invention, FIG. 13 is a schematic drawing of the operation process of tire monitoring system according to one embodiment of the present invention.

And, the labels in the drawings are described as follows:

| | |
|---|---|
| 1-automobile | 2-tire |
| 11-receiving and display unit | 12-transmitting detecting unit |
| 101-display unit | 120-RF signal |
| 102-receiving unit | 1015-encoding sensor circuit |
| 103-receiving antenna | 122-controlling and transmitting circuit |
| 1011-display area | 123-transmitting antenna |
| 1014-encoding plug | |
| 102a-receiving circuit | 102b-receiving data interface circuit |
| 11C-power supply circuit | |
| 1011a-display data interface circuit | 1011b- alarm circuit |
| 10145-encoding plug interface circuit | 101C-main control unit |

BEST MODE FOR CARRYING OUT THE INVENTION

As shown in FIG. 4, automobile 1 has four tires 2,

The automobile tire monitoring system of the present invention comprises the following three components:

1. Transmitting and detecting units 12, having a fixed ID code set, and include a sensor, a control circuit, a transmitter and transmitting antenna that are set on each tire 2. The transmitting and detecting unit 12 sends out a RF signal 120 which contains information to be detected and monitored such as pressure and temperature as well as the identification code, i.e., ID code.

2. Receiving and display unit 11 that contains receiving unit 102 and display unit 101. The receiving unit 102 includes a power supply, a receiver, a MCU and a display drive circuit. The display unit 101 includes an LCD or VFD and an encoding socket 1014. A corresponding encoding socket 1014 is provided on the data display area 1011 of each display.

3. Encoding plug 1015 includes an encoding memory circuit and plug.

The ID code of each transmitting and detecting unit 12 corresponds to the ID of an encoding plug 1015, i.e., the ID code saved in the encoding circuit in encoding plug 1015 is identical with the same as that set in the MCU memory of the corresponding transmitting and detecting unit.

According to the present invention, the transmitting and detecting unit 12 and encoding plug 1015 are manufactured and sold as a set.

An ID encoding socket 1014 is provided near the data display area 1011 on display unit 101. When using plug-in encoding memory, i.e., when the encoding plug 1015, is plugged into encoding socket 1014, the MCU of the receiving and display unit 11 reads the ID code saved in the encoding memory circuit of the plug-in encoding memory via ID code socket, and establishes the corresponding identification relationship of the ID with the corresponding tire data display area.

At each startup, the receiving and display unit reads the ID code of the plug-in encoding memory on each socket plugged into the display unit, resets the corresponding information of identification between the ID code saved in the MCU (main control unit) memory at the receiving and display unit and the tire identification, and then saves the information. After reading the ID code in the signals sent by the transmission unit, the receiving unit determines which tire the transmitting and detecting unit is sending the signals according to the corresponding relationship between the ID code in the MCU memory at the receiving and display unit and the tire identification, and displays the information of pressure and temperature on the corresponding display area.

When a tire needs rotating or moved to another location, the user only has to transpose the corresponding encoding plug 1015. Next time when the power is on, the receiving and display unit resets the corresponding relationship between the ID code saved in the MCU memory of the receiving and display unit and the tire identification, and displays the information in the right place.

Whenever the user finds a certain transmitter (transmitting and detecting unit) is damaged, he or she just needs to purchase a transmitter, then pulls out the corresponding plug of the damaged transmission unit and plugs in the new encoding plug. Next time when the power is on, the receiving and display unit resets the corresponding relationship between the ID code saved in the MCU memory of the receiving and display unit and the tire identification, and displays the signals transmitted by the transmitting and detecting unit in the right display area.

The steps of the method by which the automobile tire pressure monitoring system in this of the present invention monitors tires is as follows: The display unit 101 starts and initializes and then reads in the ID code in the circuit of the four encoding plugs 1015. Next the display unit 101 waits to receive the data sent from the receiving unit 102 and determines whether the ID code in the received data is the same as that read in. If the IDs are different, the data is discarded and the display unit 101 continues to wait to receive data. If the IDs are identical, the display unit 101 determines the corresponding display position of the ID code and displays the received data on the display and continues to wait to receive data.

This invention adopts encoding plug-in technology and converts the re-identification issue caused by tire transposition and tire replacement into the issue of resetting the ID code. Thus, it provides a simple and effective technological solution for tire re-identification. Because of the adoption of plug-in method, the operation is easy and reliable.

The invention adopts the encoding technology, reads the ID code in the plug-in encoding memory via I/O (input/output) rather than via radio signals. Consequently, it avoids the problem of LF (low frequency) signal in LF wake-up being disturbed in transmitting by the electromagnetic noise in the automobile and essentially solves the disturbance problem.

EXAMPLE 1

FIG. 5 is a circuit schematic drawing of an exemplification of the transmitting and detecting unit of this invention.

In FIG. 5, the circuit of transmitting and detecting unit 12 includes a sensor circuit 121, a control and transmission circuit 122 and a transmitting antenna 123.

When monitoring is required, control and transmission circuit 122 sends a signal to sensor circuit 121 via a data line, causing the sensor to begin to measure the pressure and the temperature. After the measurement is done, the sensor circuit 121 sends out a feedback signal to control and transmission circuit 122, which begins A/D conversion after receiving the signal. Then, the A/D converted value is encoded. The measured encoded value, ID code and the error correcting code are then framed as per certain communication protocol. Finally, the control and transmission circuit 122 transmits the data frame out via antenna 123 after modulation and frequency conversion.

EXAMPLE 2

FIG. 6 is a circuit schematic drawing of an exemplification of the receiving unit 102 of the receiving and display unit 11 of this invention.

As mentioned above, receiving and display unit 11 includes a display unit 101, a receiving unit 102 and a receiving antenna 103, which are connected by signal interface.

In this example, the circuit of the receiving unit 102 contains three parts: a power supply circuit, a receiving circuit 102a, and a data receiving interface circuit 102b. The function of power circuit is to provide power for the whole receiving and display unit, to start the unit automatically when the automobile is started, or to start the unit when the tire monitoring system is started. The function of the receiving circuit 102a is to receive, demodulate, decode and convert the RF signal 120 transmitted by antenna 123 and then send the converted display data to the data receiving interface circuit 102b, which in turn sends the received data to display unit 101.

Receiving circuit 102a also determines whether the received signal is needed or not. If it is determined that the received signal is not needed it is discarded. If it is determined that the received signal is needed it is converted. Since there is much radio noise in the space, sometimes error signals may be produced. As a result, the receiving circuit has to determine whether the received data is the encoding data in the communication protocol or some other error signal data.

EXAMPLE 3

FIG. 7 shows a circuit principle of display unit 101 of receiving and display unit 11 according to the present invention.

In the example, the circuit of display unit 101 includes the following; a main control unit 101C, a code plug interface circuit 10145, a data displaying interface circuit 1011a and an alarm circuit 1011b.

In the figure, data receiving interface circuit 102b receives signals from receiving unit 102 and transmits them to display unit 101 for processing.

The received signal 120 is processed by main control unit 101C as follows: First, main control 25 unit 101C reads information, especially the ID code, then compares the received ID to the ID code obtained from code plug interface circuit 10145. If the IDs do not match, the received data is discarded and the next signal from data receiving interface circuit 102b is waited for. If the IDs match, the processing will continue, i.e., the data will be transmitted to data display interface unit 1011a for display in a predetermined display area.

In the above process, main control unit 101C can determine the corresponding display area for data system based on the position of ID code and code plug and also the corresponding relationship between the initial ID code at starting and its display area.

Meanwhile, an alarm circuit 1011b is also set. If the information received is abnormal after processing, converting and comparing with the set data range, then alarm circuit 1011b will warn the driver. An alarm buzzer is used in this example for a warning.

Through encoding plug interface circuit 10145, main control unit MCU 101C reads code plug 1015 at each restarting, i.e., ID code in external plug-in encoding plug memory, and saves an identifying relation between ID code and its corresponding tire data display area 1011 in the memory of MCU 101C.

Receiving unit 102 converts the frequency of RF 120 and demodulates it after receiving radio signal from the receiving antenna 103. After finishing these processes, the demodulated digital signal will be transmitted to MCU 101C via data receiving interface circuit 102b.

MCU 101C processes the digital signal received, extracts temperature, pressure value and ID code. Then MCU reads the established ID code and its identifying relation with corresponding tire data display area, and then compares it to the received ID code. If the IDs are the data for this system, MCU will process the received temperature and pressure values and send them to display area 1011 via data display interface 1011a for displaying the data in corresponding areas.

MCU 101c can also preset the normal value range and send abnormal data to alarm circuit 1011b simultaneously as date is displayed.

In a specific scheme of this invention, encoding plug 1015 should be an external, plug-in type with encoding memory, ID code in internal memory, including connecting port and encoding memory circuit.

The connecting port includes interface circuit and connecting circuit. The interface circuit can be divided into a parallel-port circuit and a serial-port circuit.

The connecting circuit is the one connecting encoding memory circuit with MCU circuit.

Some conventional techniques can be adopted in the practice of interface circuit and connecting circuit, for example:

Plugs and sockets can be connected by the connecting interface circuit. Their clamps can be tied on a PCB with gold plating connectors, i.e., golden fingers. The PCB can be directly plugged onto the socket through golden finger and connected with the interface circuit of the socket.

The encoding memory circuit can be in the form of SIM card or IC card. For example, a memory circuit can be embedded in SIM card or IC card and the codes in the memory can be read via SIM card or IC card interface.

In this invention, encoding memory circuit is important in identification and many techniques can be implemented in this regard. The examples below are the applications in automobiles, which consider comprehensively the cost, reliability, maintenance and convenience in addition to technical effect.

FOLLOWING EXAMPLES

Memory is the most important part in encoding memory circuit.

The memory in example 4-1 is a shift type memory with its principle indicated in FIG. 8.

In data writing, data D1 will be transmitted to register and all data will move by one digit to the right at each coming of clock signal DP. In data reading, all data will move by one digit to the left to read value from D1 port. This is actually a serial encoding circuit, one digit is read at one time. For example in a 16-digit code reading, the external circuit will give 16 clock signals CP. One digit is read from D1 port at each time until all 16 digits of the code (ID code) are read. If 8-digit code is needed, the external circuit will give 8 clock signals. Others are similar.

The memory can be matrix type memory which is realized by switch, diode, MOS tube, transistor or PLA respectively. The memory in Example 4-2 is a switch matrix type memory. FIG. 9 shows its principles.

The figure shows a line-connecting switch matrix, which determines code by the status of signal line of parallel port. The connection to ground is set as a binary digit "0", and the connection to VDD is set as "1". Thus, an 8-digit code can be obtained by the status of 8 signal lines. The 8-digit code can be used as ID code and be read via the interface.

The memory in Example 4-3 is a diode matrix type; FIG. 10 shows its principles.

The diode memory matrix is actually a diode encoder. When one line (e.g., PTB2) of PTB0-PTB3 has a low voltage, while the voltages on other lines are all high, the value of PTC0-PTC3 can be read. PTC0-PTC3 has a pull up resistance and is set as logic "0" if a diode is 10 connected at the joint. (Otherwise, it will be set as logic "1"). When the four lines of PTB0-PTC3 are all at low level, then PTC0-PTC3 can read four 4-digit values, which constitute a 16-digit code together. This 16-digit code can be used as ID code.

The memory in Example 4-4 is a MOS tube matrix type memory. FIG. 11 shows its principles.

MOS memory matrix adopts the same principle as in diode memory matrix memory. The only difference lies in the fact that MOS tube is used instead of diode.

A transistor matrix memory can also be used.

Similarly, the transistor memory matrix is same in principle as a diode memory matrix memory. The only difference lies in the fact that transistor is used instead of diode.

All the examples stated above can be combined or integrated in practices. Hence, the number of the final technical schemes is the product of the numbers of every example.

FIG. 12 is an example that shows the working process of the present automobile tire monitoring system. The example focuses on pressure monitoring.

First transmitting and detecting unit 12 obtains electrical signal from pressure sensor and sends the signal to controlling and transmitting circuit for encoding after the electrical signal is amplified and processed by A/D converter. Both data code and ID code in ordered format can be generated through encoding. Then, the codes will be modulated by FSK modulator, amplified by amplifier circuit and finally transmitted via the antenna.

After receiving RF signal 120 sent by antenna, the receiving circuit 102a in receiving and display unit 11 will transmit the signal to MCU 101C via low noise amplifier, digital filter, high frequency demodulator and data receiving interface circuit 102b.

MCU 101C reads the ID code in encoding plug 1015 via encoding plug circuit 10145 and displays the corresponding relation between ID code and socket 1014.

MCU 101C determines whether to discard the received information or to display it according to the ID code in the read code plug 1015 and the ID code in the signal transmitted via data receiving circuit.

When the information from data receiving circuit is determined to be effective and needs to be displayed, the information and ID code related to tire identifying and corresponding relationship will be displayed in the display area via display drive controlling circuit. Normally, an LCD display is used.

FIG. 13 is an example that shows a monitoring method of the present automobile tire monitoring system. The automobile in the example has four tires.

Following are the specific steps:
Step 600: Start up;
Step 601: Initialize;
Step 602: Read in ID codes in four encoding plug memory circuits;
Step 603: Establish and save the corresponding relationship between ID code and tire identification, i.e., the corresponding relation required for the tires at different locations to display in proper areas;
Step 604: Wait to receive data, i.e., wait for the data from transmitting and detecting unit;

Step 605: Judge whether the data is truly received; (i.e., determine whether the received data is the code data in communication protocol or other error signal or data)

Step 606: Determine whether the ID codes in the received data are in accord with the saved ID code stated in Step 603;

If the data do not match, proceed with Step 620 and discard the data; Then, go back to Step 604 and wait to receive data.

If the data match, proceed with Step 610 to determine the corresponding display area for the ID code.

Step 611: Display data, i.e., display the received data in corresponding display area in a proper way; Go back to Step 604 and waiting to receive data.

The corresponding software for steps stated above is saved in the MCU of receiving and display unit when the automobile tire monitoring system is manufactured. It can be either fixed (i.e., read only) or programmable.

The software can also be used to save the value range for monitoring items and compare the monitored items with received data to determine whether the results are within the proper value range. This invention can also be used to determine whether the effective information is within a reasonable range. If not, the alarm circuit or other controllers will be triggered to give out reminders or warnings.

What is claimed is:

1. An automobile tire monitoring method which comprises the following steps:
    a) providing the automobile tire pressure monitoring system comprising: a plurality of transmitting and detecting units each separately provided on a different tire of a vehicle and a receiving and display unit; each transmitting and detecting unit including a sensor, a controlling and transmitting circuit and a transmitting antenna; and the receiving and display unit includes a receiving unit, a main control unit and a display unit, the receiving and display unit also comprises several plug-in code memories, each of the plug-in code memories has a fixed ID code, each transmitting and detecting unit has a fixed ID code which corresponds to the ID code fixed in one of said several plug-in memories:
    b) starting and initializing the system;
    c) reading in ID codes from the plug-in code memories;
    d) establishing and saving a corresponding relationship between the read in ID codes and tire identification;
    e) receiving data from at least one of the transmitting and detecting units;
    e) determining whether an ID code in received data corresponds to one of the read in ID codes;
    f) if the ID code in the received date does not match one of the read in ID codes discard the received data and wait to receive more data from at least one of the transmitting and detecting units;
    g) if the ID code in the received date does matches one of the read in ID codes, display information in the received data; and
    h) continue monitoring tire pressure by repeating steps e) through h).

2. The monitoring method according to claim 1, further comprising providing an alarm circuit and activating an alarm when sensed tire pressure is outside of a predetermined range.

3. The monitoring method according to claim 1, wherein the data transmitted by the transmitting and detecting units is acquired by the sensors and magnified and converted by an A/D converter and encoded together with fixed ID code in the respective transmitting and detecting unit and then transmitted via an antenna after modulating and magnifying the transmission signal.

* * * * *